United States Patent Office.

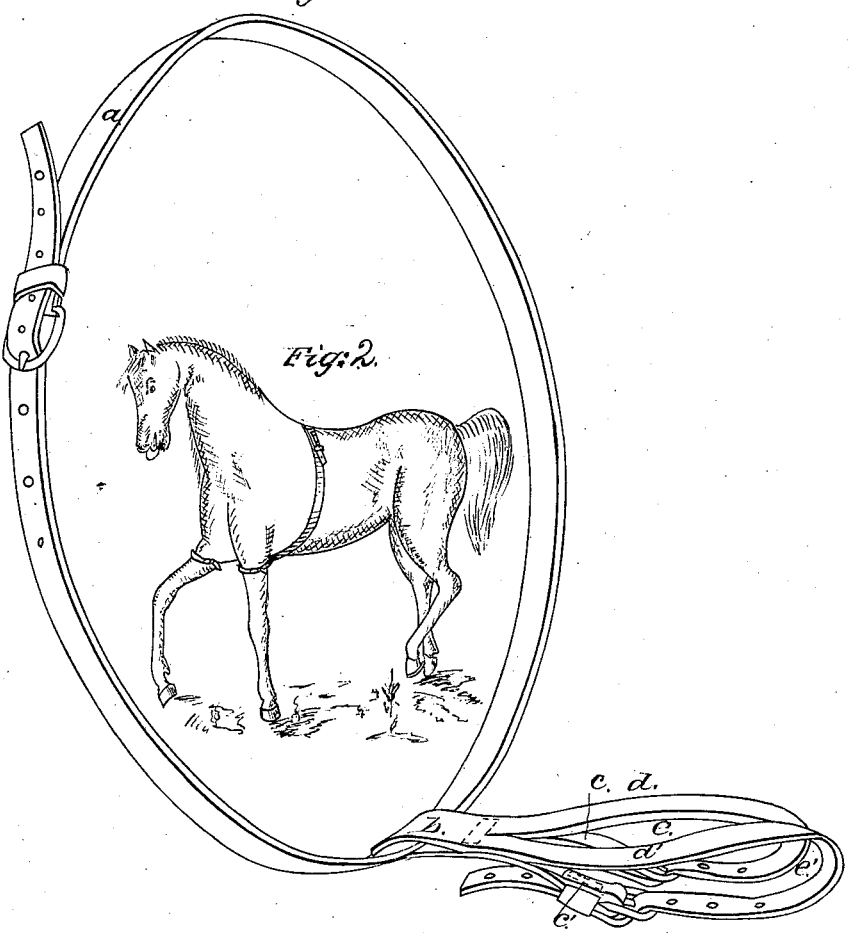

A. H. LEWIS, OF NORTH GREENBUSH, NEW YORK.

Letters Patent No. 76,640, dated April 14, 1868.

IMPROVED DEVICE FOR FETTERING HORSES.

The Schedule referred to in these Letters Patent and making part of the same.

TO ALL WHOM IT MAY CONCERN:

Be it known that I, A. H. LEWIS, of North Greenbush, in the county of Rensselaer, and State of New York, have invented a new and useful Device for Fettering Horses; and I do hereby declare that the following is a full, clear, and exact description of the construction and operation of the same, reference being had to the accompanying drawings, and letters of reference marked thereon, making a part of this specification, of which—

Figure 1 is a perspective view, and

Figure 2 a view showing its attachment to the animal.

This invention consists of a device for preventing horses from raising their fore legs, in the act of jumping or running, to the end that they may be easily caught when loose, as in pasture, and may not overleap fences, as will hereinafter more fully appear.

To enable others skilled in the art to make and use my invention, I will proceed to describe its construction and operation.

$a$ represents a stout leather strap, to be passed around the body of a horse, just behind his shoulders, and confined by buckling. $b$ represents a strap passed around the strap $a$, and sewed so as to form a loop around it large enough to permit the strap $b$ to slide freely upon the strap $a$. The ends of the strap $b$, next to the parts that are sewed together, are forked, the lesser forks, $c$ $c'$, bearing buckles on their ends, and the longer forks, $d$ $d'$, being provided with holes in the common fashion, so that the ends $c$ and $c'$ and $d$ and $d'$ may be buckled together, and form loops $e$ and $e'$. These loops encircle the fore legs of the horse, and if fastened around them at the proper points, prevent the animal from raising its fore legs to run or jump, as the loops are firmly held by the strap $a$, which must yield before the legs can be raised.

The device is applied in such a manner that no great amount of force can be exerted by the animal to break either of the straps, as his attempts are checked at the very outset.

Having thus fully described my invention, what I claim as new, and desire to secure by Letters Patent, is—

The strap $a$, in combination with the strap $b$ and the loops $e$ $e'$, as and for the purpose set forth.

A. H. LEWIS.

Witnesses:
W. S. HEVENOR,
C. HEVENOR.